Jan. 23, 1968   A. A. ROOD   3,364,824
MODULATED VALVE ASSEMBLY
Filed Oct. 22, 1965
2 Sheets-Sheet 1

INVENTOR.
Alvin A. Rood
BY
E. J. Biskup
ATTORNEY

INVENTOR.
Alvin A. Rood
BY
E. J. Biskup
ATTORNEY

United States Patent Office 3,364,824
Patented Jan. 23, 1968

3,364,824
MODULATED VALVE ASSEMBLY
Alvin A. Rood, Willoughby, Ohio, assignor to General Motors Corporation, Detroit, Mich., a corporation of Delaware
Filed Oct. 22, 1965, Ser. No. 502,077
11 Claims. (Cl. 91—420)

ABSTRACT OF THE DISCLOSURE

A fluid operated actuator for controlling the position of a poppet valve having fluid under pressure acting on one side thereof. The poppet valve is located in a housing for normally blocking fluid flow between first and second passages. A pressure-operated piston member engages the poppet valve and serves to urge the same to an open position to permit fluid flow between the passages. The piston member has a bleed passage and means located in the bleed passage to provide an increase in the size thereof when the piston member moves under pressure in a direction to unseat the poppet valve to thereby control the extent of opening of the poppet valve.

This invention concerns a hydraulic circuit for controlling movement of a hydraulic cylinder and more particularly a fluid operated actuator that controls the speed of movement of such cylinder.

In certain earth-moving equipment such as scrapers wherein the bowl, apron, and ejector are hydraulically powered, it is common to use poppet type valves for controlling the flow of pressurized fluid to and from the various hydraulic cylinders. Such valves are normally of large capacity having correspondingly large unbalanced forces acting on them so that it becomes very difficult to manually control the position of the valves. Accordingly, where poppet valves are utilized in hydraulic circuits of this type, it is customary to power operate the valves through pilot lines. However, one drawback of this type of arrangement is that pilot operated poppet valves do not enjoy any throttling properties because when sufficient pressure is applied to overcome the opening force, they move to a full open position and as soon as the pressure is reduced, the valve again assumes the fully closed position.

The present invention alleviates the above-mentioned problem by providing a fluid operated actuator which can be remotely operated and accurately control the position of a poppet valve so that the latter can enjoy throttling characteristics. More specifically, this invention provides a fluid operated actuator comprising a housing having a first passage which communicates with a second passage. A poppet valve is located in the first passage for normally blocking fluid flow between the two passages and is adapted to be engaged by a piston member slidably supported in the housing for urging the poppet valve to an open position to permit fluid flow between the passages. A chamber is formed in the housing adjacent one side of the piston member and a bleed passage is located in the piston member for connecting the chamber with the second passage. Throttling means are fixed to the housing and located in the bleed passage to provide an increase in the size thereof when the piston member moves in a direction to unseat the poppet valve under the influence of pressurized fluid which is directed to the chamber at a controlled rate so that the piston member moves to unseat the poppet valve until the forces acting on the piston member and the poppet valve are balanced.

Figure 1:
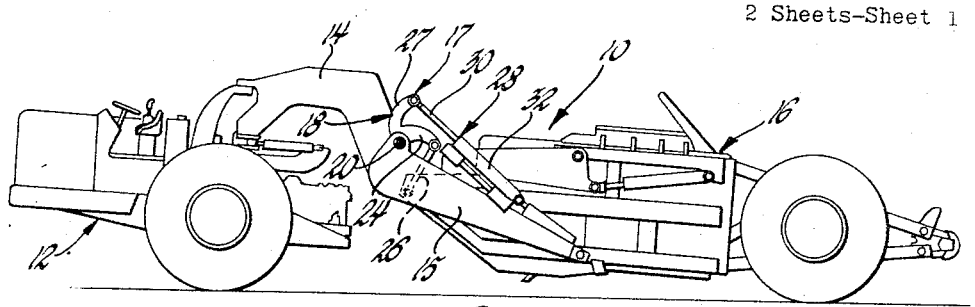
Figure 2:
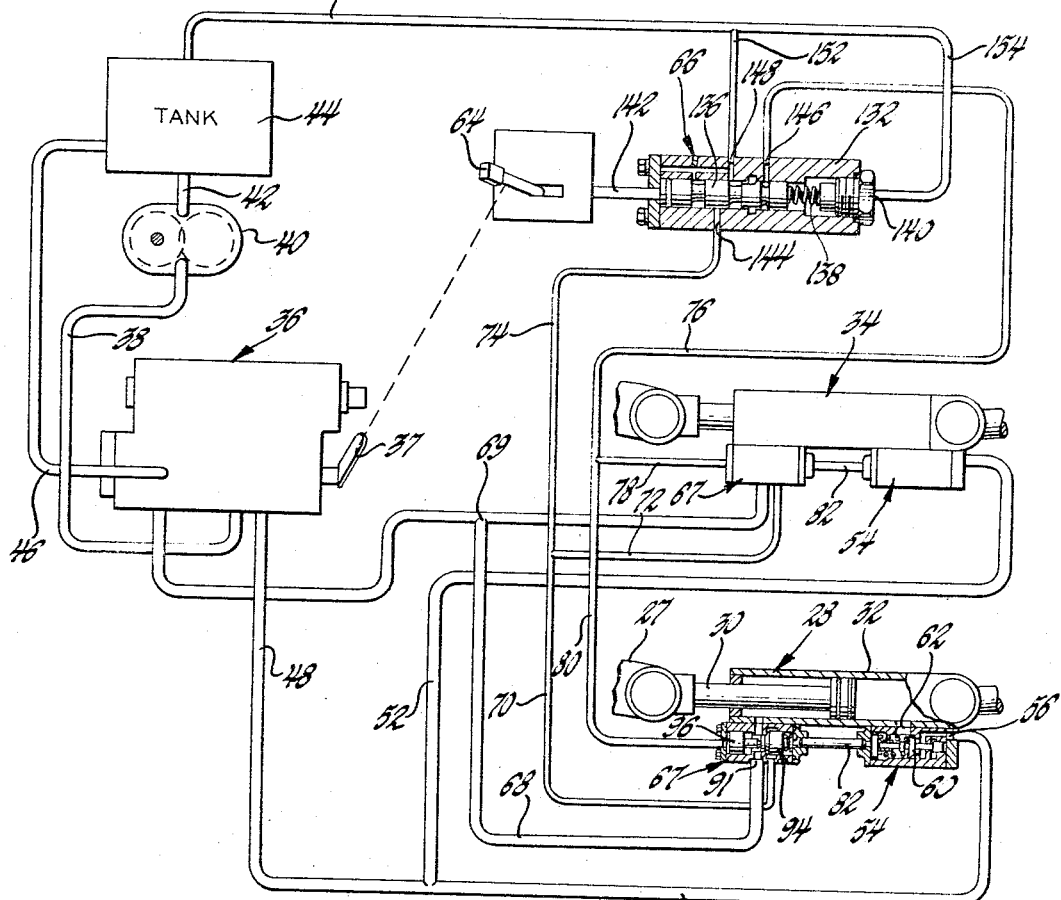
Figure 3:
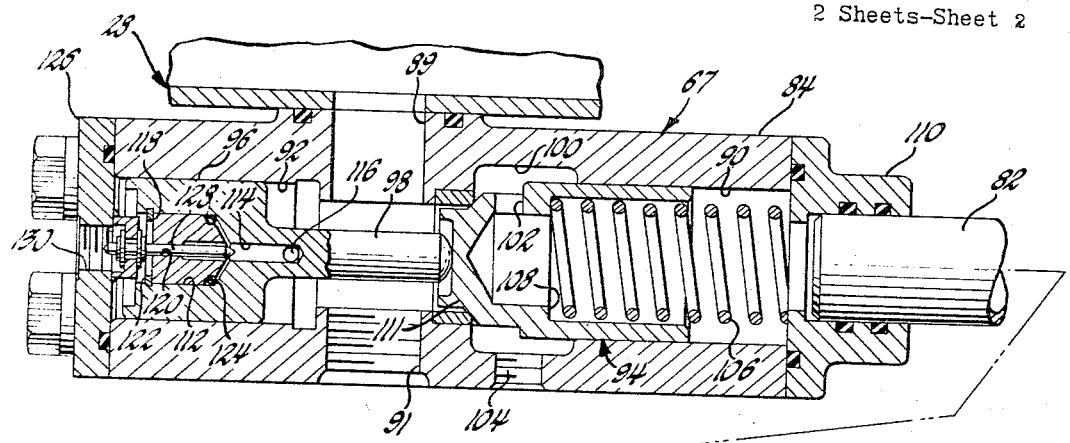
Figure 3:
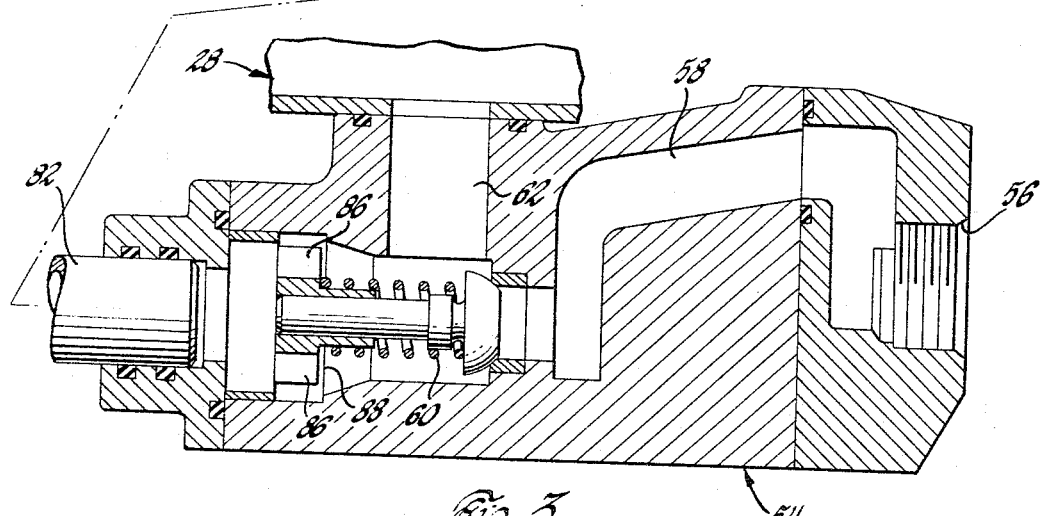
Figure 4:
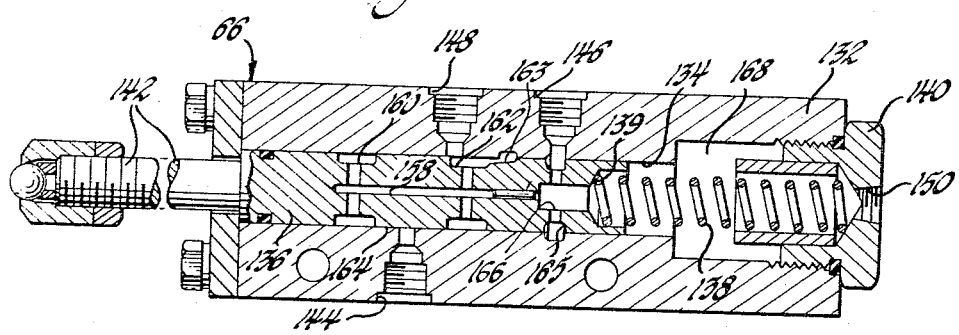

A more complete understanding of the present invention will be derived from the following detailed description when taken in conjunction with the drawings in which:

FIGURE 1 shows a scraper employing hydraulic cylinders combined with fluid actuators made in accordance with the invention;

FIGURE 2 schematically illustrates a hydraulic circuit incorporating the hydraulic cylinders of FIGURE 1;

FIGURE 3 is an enlarged sectional view showing the details of a fluid actuator made in accordance with the invention, and FIGURE 4 is an enlarged sectional view showing a control valve which serves to pressurize and actuate the fluid actuator.

Referring to FIGURE 1, a scraper 10 is shown comprising an overhung tractor 12 connected by the usual drawbar 14 and laterally spaced pull arms 15 to a trailing bowl 16 that is movable between a carry position and a dig position. In order to move the bowl 16 between the aforementioned positions, a lift mechanism 17 is provided comprising a bellcrank 18 supported for pivotal movement at a point 20 on the forward end of the pull arm 15. One arm 24 of the bellcrank 18 pivotally supports a link 26, the lower end of which is pivotally connected to the forward end of the bowl 16. The other arm 27 of the bellcrank 18 is pivotally connected to a single-acting hydraulic cylinder 28 which in turn is pivotally supported at its lower end on the pull arm 15 and consists of the usual cylinder member 30 and piston member 32. By expanding the hydraulic cylinder 28, the bellcrank 18 will be rotated about its pivotal connection with the pull arm 15 so as to raise the bowl 16 to a carry position. Conversely, upon contraction of the hydraulic cylinder 28, the bowl 16 can be lowered to a digging position.

At this juncture, mention should be made that only one side of the scraper is shown; however, it will be understood that the opposite side thereof has corresponding components mounted thereon. In other words, an identical lift mechanism including a bellcrank is located on the other side of the scraper and is actuated by a single-acting hydraulic cylinder which, as seen in FIGURE 2, is identified by the numeral 34. Accordingly, a detailed disclosure is given of the hydraulic cylinder 28 and the various parts and operating components attached thereto, it being understood that the hydraulic cylinder 34 is equipped with corresponding parts and components.

The hydraulic circuit for operating the hydraulic cylinders 28 and 34 is shown in FIGURE 2 and comprises a master control valve 36 that receives pressurized fluid via line 38 from a pump 40 which in turn is connected by a line 42 to a reservoir or tank 44. Although not shown, the control valve 36 incorporates the usual spool valve which can be moved by a lever 37 to assume a hold-position, bowl-drop position, and a bowl-raise position. When the lever 37 is in the hold-position, pressurized fluid generated by the pump 40 passes through the control valve 36 and a line 46 back to the tank 44.

When the lever 37 is moved to the bowl-raise position, pressurized fluid flows through a line 48 and branch lines 50 and 52 to the piston head end of the respective hydraulic cylinders 28 and 34 to expand the latter. Each of the hydraulic cylinders 28 and 34 has a fluid inlet assembly 54 attached thereto which, as seen in FIGURE 3, includes a fluid inlet port 56 and passage 58 that direct pressurized fluid through a suitable check valve 60 and passage 62 into the piston head portion of the cylinder. During such time, the cylinder expands and, as mentioned above, causes the bellcrank 18 to rotate in a counterclockwise direction, as viewed in FIGURE 1, to raise the bowl 16 to a carry position.

When the lever 37 is in the bowl-drop position, a suitable mechanical interconnection between the lever 37 and a lever 64 causes an auxiliary control valve 66 to be actuated for lowering the bowl 16. As will be more fully understood as the description of the invention proceeds, the auxiliary control valve 66 serves to control the flow of pressurized fluid to a pair of identical fluid operated actuators 67, each of which is attached to the rod end of the hydraulic cylinders 28 and 34 and is adapted to vent the head end of the cylinders to the tank 44 via lines 68, 69, control valve 36, and line 46 so that the bowl 16 will drop by gravity. The auxiliary control valve 66 obtains the pressurized fluid for energizing the actuators 67 from the piston head end of each of the hydraulic cylinders through lines 70, 72, and 74 and directs it to the actuators 67 via pilot lines 76, 78, and 80 in a manner which will now be described.

Referring to FIGURES 2 and 3, it will be noted that the fluid inlet housing 54 attached to hydraulic cylinder 28 is connected by a hollow tube 82 with a housing 84 which forms a part of the associated fluid operated actuator 67. Thus, fluid can flow from the piston head end of the cylinder through appropriate openings 86 formed in a check valve support 88 and then through the tube 82 into the interior and the rear portion of the fluid actuator 67.

The housing 84 is formed with ports 89 and 91 which respectively connect with the rod end of the cylinder 28 and the tank 44 through lines 68 and 69. A pair of coaxial bores 90 and 92 in the housing 84 connect with the latter-mentioned ports and respectively house a poppet valve 94 and a slidable piston member 96 having an integrally formed projection 98. The bore 90 has an annular chamber 100 of an increased diameter which is located adjacent to the head end of the poppet valve 94. An aperture 102 is provided in the poppet valve 94 for communicating fluid between the hollow interior of the poppet valve and the chamber 100 which in turn is connected through a port 104 with the pilot line 70 or 72 that leads to the auxiliary control valve 66 for supplying piston head pressurized fluid to the latter. As is conventional, the poppet valve 94 is normally biased into a closed position by a coil spring 106, one end of which engages a shoulder 108 while the other end rests on a cap 110 rigidly and sealingly connected to the actuator housing 84.

The piston member 96 is normally located in the position indicated in FIGURE 3 wherein the end of the projection 98 engages the head end 111 of the poppet valve 94. A bore 112 is centrally formed in one end of the piston member 96 and connects with an elongated passage 114 that extends partially into the projection 98 and terminates with a laterally extending port 116 that communicates with the port 91 and line 68. A plug member 118 is located in the bore 112 and is formed with a stepped bore 120 having the larger diameter thereof adjacent to and coaxially with the passage 114. A lock washer 122 retains the plug member 118 within the bore 112 and in engagement with a O ring seal 124. A cap 126 closes the bore 92 and rigidly supports an axially extending pin 128 which is tapered and adapted to be received within the bore 120 in the plug member 118. It will be noted that the pin 128 is tapered in a direction towards the poppet valve 94 so that the smaller diameter is at the tip portion of the pin while the larger diameter is closer to the cap 126 and of a size which permits a snug fit with the smaller diameter of the bore 120. A port 130 is provided in the cap 126 and is connected through the pilot line 80 to the auxiliary control valve 66.

The auxiliary control valve 66 is shown in detail in FIGURE 4 and comprises a cylindrical housing 132 having an elongated axial bore 134 formed therein which slidably supports a spool valve 136. The normal position of the spool valve 136 is that shown in FIGURE 4 and is maintained by a coil spring 138, one end of which abuts a shoulder 139 while the other end rests within and engages a cap member 140 threadedly secured to the end of the housing 132. A rod 142 is rigidly connected to the spool valve 136 and extends outwardly from the housing 132 for connection with the lever 64.

The housing 132 is formed with a pressure inlet port 144 that connects with line 74, a pressure outlet port 146 that connects with line 76, and two bleed ports 148 and 150, the latter of which are respectively connected by lines 152 and 154 to the tank 44 via line 156. It will be noted also that the spool valve 136 is formed with a centrally located and axially extending passage 158 which interconnects annular chambers 160 and 162 formed in the body of the spool valve 136 and separated by a land portion 164. Chamber 162 is shaped so as to have an elongated tapering cutout portion 163 so as the spool valve 136 is moved to the right, as seen in FIGURE 4, a gradual or modulated registration with the port 146 is realized.

The operation of the present invention is as follows:

As seen in FIGURES 1 and 4, the spool valve 136 is in the hold position wherein the land portion 164 blocks the pressure inlet port 144 while the pressure outlet port 146 is connected by chamber 165 and passage 166 to the spring chamber 168 to vent the pilot line 76 to the tank 44. Now, should the scraper operator desire to lower the bowl 16, the lever 37 is moved toward the bowl-drop position resulting in simultaneous movement of lever 64 and the spool valve 136 to the right as viewed in FIGURE 4.

By proper manipulation of the lever 37, the speed of bowl drop can be controlled by the operator. In other words, the further the spool valve 136 is moved to the right, the faster the bowl 16 will drop. This is so because chamber 162 has the tapered cutout 163 and therefore a greater registration with the pressure outlet port 146 is obtained as the spool valve 136 moves further to the right. Thus, assuming the spool valve 136 is shifted to a position where slight registration is realized between chamber 162 and port 146, the chamber 160 similarly moves into a position where it registers with the pressure inlet port 144. When this occurs, a certain amount of pressurized fluid at the head end of the hydraulic cylinders 28 and 34 will be directed via the pilot lines 70, 72, and 74 to the pilot lines 76, 78, and 80 which connect to the actuators 67. As seen in FIGURE 3, the pressurized fluid will flow into each of the actuators 67 to fill the chamber to the rear of the piston member 96 and cause a pressure build-up which acts against the piston member 96 to urge it to the right, as viewed in FIGURE 3, and unseat the poppet valve 94. For each fixed position of the spool valve 136, there is a fixed position of the piston member 96 and, accordingly, the poppet valve 94. Thus, as the spool valve 136 is moved further to the right to a new position, the flow of fluid through the pilot lines 76, 78, and 80 is increased further and the piston member 96 moves further to the right to a new position to further open the poppet valve 94 and permit an increased fluid flow from the hydraulic cylinders. Moreover, the further the piston member moves to the right, the greater the clearance between the pin 128 and the smaller diameter of the bore 120. This permits a predetermined amount of fluid to pass through the passage 114 and port 116 and serves to establish a pressure equilibrium between the forces acting on the poppet valve 94 and the piston member 96. This accounts for the infinite number of stable positions which can be assumed by the poppet valve 94 between a fully closed and fully open position.

As alluded to hereinbefore, the hydraulic cylinders 28 and 34 utilized for actuating the lift mechanism to raise the bowl or drop it are of the single-acting type. Accordingly, when the poppet valve 94 is opened, fluid from the piston head end of each cylinder flows through the passage 62 and the tube 82 to port 91 which leads to the tank 44. In this manner, the bowl is dropped by gravity with the speed of dropping being controlled by the position assumed by the poppet valve as explained above. Moreover, although not shown, a suitable interconnection is provided between the piston head ends of the two hydraulic cylinders 28 and 34 in order to equalize pressure between them while the bowl is lowered.

It will be understood that various changes can be made in the details of construction and in the arrangement of the elements disclosed herein without departing from the principles of the invention or scope of the following claims.

I claim:

1. A fluid operated actuator for controlling the position of a poppet valve having fluid under pressure acting on one side thereof comprising, a housing having a first passage communicating with a second passage, said poppet valve located in said first passage for normally blocking fluid flow between said first and second passages, a piston member slidably supported in said housing for engaging said poppet valve and urging the same to an open position to permit fluid flow between said passages, a chamber formed in said housing adjacent one side of said piston member, a bleed passage provided in said piston member and connecting said chamber with said second passage, means fixed to said housing and located in said bleed passage to provide an increase in the size thereof when said piston member moves in a direction to unseat said poppet valve, and means for directing pressurized fluid to said chamber at a controlled rate whereby said piston member is moved to unseat said poppet valve until the forces acting on said piston member and said poppet valve are balanced.

2. A fluid operated actuator for controlling the position of a spring biased poppet valve having fluid under pressure acting on one side thereof comprising, a housing having a first passage communicating with a second passage, said poppet valve located in said first passage for normally blocking fluid flow between said first and second passages, a piston member axially spaced from said poppet valve and slidably supported in said housing for engaging said poppet valve and urging the same to an open position to permit fluid flow between said passages, a chamber formed in said housing adjacent one side of said piston member, an axially extending bleed passage provided in said piston member and connecting said chamber with said second passage, a pin fixed to said housing and located in said bleed passage to provide an increase in the size thereof when said piston member moves in a direction to unseat said poppet valve, and means for directing pressurized fluid to said chamber at a controlled rate whereby said piston member is moved to unseat said poppet valve until the forces acting on said piston member and said poppet valve are balanced.

3. A fluid operated actuator for controlling the position of a spring biased poppet valve having fluid under pressure acting on one side thereof comprising, a housing having a first passage communicating with a second passage, said poppet valve located in said first passage for normally blocking fluid flow between said first and second passages, a piston member slidably supported in said housing and including a projection for engaging said poppet valve and urging the same to an open position to permit fluid flow between said passages, a chamber formed in said housing adjacent one side of said piston member, an axially extending bleed passage provided in said piston member and connecting said chamber with said second passage, a tapered pin fixed to said housing and located in said bleed passage to provide an increase in the size thereof when said piston member moves in a direction to unseat said poppet valve, and a control valve for directing pressurized fluid to said chamber at a controlled rate whereby said piston member is moved to unseat said poppet valve until the forces acting on said piston member and said poppet valve are balanced.

4. A fluid operated actuator for controlling the position of a spring biased poppet valve having fluid under pressure acting on one side thereof comprising, a housing having a first passage communicating with a second passage, said poppet valve located on side of said second passage and in said first passage for normally blocking fluid flow between said first and second passages, a piston member located on the other side of the second passage and slidably supported in said housing, a projection extending from the piston member for engaging said poppet valve and urging the same to an open position to permit fluid flow between said passages, a chamber formed in said housing adjacent one side of said piston member, a bleed passage provided in said piston member and connecting said chamber with said second passage, a tapered pin fixed to said housing and located in said bleed passage to provide an increase in the size thereof when said piston member moves in a direction to unseat said poppet valve, and means for directing pressurized fluid to said chamber at a controlled rate whereby said piston member is moved to unseat said poppet valve until the forces acting on said piston member and said poppet valve are balanced.

5. A fluid operated actuator for controlling the position of a spring biased poppet valve having fluid under pressure acting on one side thereof comprising, a housing having a first passage communicating with a second passage that is substantially perpendicular to the first passage, said poppet valve located in said first passage for normally blocking fluid flow between said first and second passages, a piston member slidably supported in said housing coaxial with said first passage and engaging said poppet valve for urging the same to an open position to permit fluid flow between said passages, a chamber formed in said housing adjacent one side of said piston member, a bleed passage provided in said piston member and connecting said chamber with said second passage, means fixed to said housing and located in said bleed passage to provide an increase in the size thereof when said piston member moves in a direction to unseat said poppet valve, and means for directing pressurized fluid to said chamber at a controlled rate whereby said piston member is moved to unseat said poppet valve until the forces acting on said piston member and said poppet valve are balanced.

6. In combination with a hydraulic cylinder having a piston relatively movable therein, a housing adjacent said cylinder and having a passage interconnecting the opposite ends of the cylinder, a poppet valve in said passage, a spring normally biasing the poppet valve to close said passage, means for opening said poppet valve a predetermined amount so as to control the rate of fluid transferred between said opposite ends of said cylinder, said means comprising a source of pressurized fluid, a fluid operated actuator slidably located in said housing for engaging said poppet valve, conduit means connecting one side of said piston with said source of pressurized fluid, a control valve interposed in said conduit, said actuator having a fluid bleed passage connected to said one side of said actuator, means fixed with said housing and located in said bleed passage to provide an increase in the size thereof when said actuator moves in a direction to unseat said poppet valve, said control valve adapted to increase the flow rate of said pressurized fluid to said one side of said actuator whereby the latter is moved to unseat said poppet valve until the forces acting on the opposite sides of the said poppet valve are balanced.

7. In combination with a hydraulic cylinder having a piston relatively movable therein, a housing adjacent said cylinder and having a passage interconnecting the opposite ends of the cylinder, a poppet valve in said passage, a spring normally biasing the poppet valve to close said passage, means for opening said poppet valve a predetermined amount so as to control the rate of fluid transferred between said opposite ends of said cylinder, said means comprising a source of pressurized fluid, a fluid operated actuator slidably located in said housing for engaging said poppet valve, conduit means connecting one side of said piston with said source of pressurized fluid, a manually operable control valve interposed in said conduit, said actuator having a fluid bleed passage connected to said one side of said actuator, means fixed with said housing and located in said bleed passage to provide an increase in the size thereof when said actuator moves in a direction to unseat said poppet valve, said control valve including means for modulating fluid flow through said conduit in response to movement of the control valve, said means adapted to increase the flow rate of said pressurized fluid to said one side of said actuator whereby the latter is moved to unseat said poppet valve until the forces acting on the opposite sides of the said poppet valve are balanced.

8. In a hydraulic system including a hydraulic cylinder having a piston relatively movable therein, a fluid reservoir, and fluid means drawing fluid from said reservoir for pressurizing one end of said cylinder, the combination comprising a housing adjacent said cylinder and having a passage connecting said one end of the cylinder with said reservoir, a poppet valve in said passage, a spring normally biasing the poppet valve to close said passage, means for opening said poppet valve a predetermined amount so as to control the rate of fluid transferred from said one end of said cylinder to said reservoir, said means comprising a fluid operated actuator slidably located in said housing for engaging said poppet valve, conduit means connecting one side of said actuator with said pressurized end of said cylinder, a control valve interposed in said conduit, said actuator having a fluid bleed passage interconnecting said one side of said actuator with the reservoir, means fixed with said housing and located in said bleed passage to provide an increase in the size thereof when said actuator moves in a direction to unseat said poppet valve, said control valve adapted to increase the flow rate of pressurized fluid to said one side of said actuator whereby the latter is moved to unseat said poppet valve until the forces acting on the actuator and the said poppet valve are balanced.

9. In a hydraulic system including a hydraulic cylinder having a piston relatively movable therein, a fluid reservoir, and fluid means drawing fluid from said reservoir for pressurizing one side of said piston, the combination comprising, a housing adjacent said cylinder and having a first passage interconnecting the opposite ends of the cylinder and a second passage leading to the reservoir, a poppet valve in said first passage, a spring normally biasing the poppet valve to close said first passage so as to prevent exchange of fluid between said one end of the cylinder and the reservoir, means for opening said poppet valve a predetermined amount so as to control the rate of fluid transferred between said one end of said cylinder and the reservoir, said means comprising a source of pressurized fluid, a fluid operated actuator slidably located in said housing for engaging said poppet valve, conduit means connecting one side of said actuator with said source of pressurized fluid, a control valve interposed in said conduit, said actuator having a fluid bleed passage interconnecting said one side of the actuator and the reservoir, means fixed with said housing and located in said bleed passage to provide an increase in the size thereof when said actuator moves in a direction to unseat said poppet valve, said control valve adapted to increase the flow rate of said pressurized fluid to said one side of said actuator whereby the latter is moved to unseat said poppet valve until the forces acting on the opposite sides of the said poppet valve are balanced.

10. In a hydraulic system including an earthmoving scraper having a bowl, a single acting hydraulic cylinder having a piston relatively movable therein and connected to said bowl for raising and lowering the latter, a fluid reservoir, and fluid means drawing fluid from said reservoir for pressurizing one end of said cylinder so as to raise said bowl to a carry position, the combination comprising, a housing adjacent said cylinder and having a passage connecting said one end of the cylinder with said reservoir, a poppet valve in said passage, a spring normally biasing the poppet valve to close said passage, means for opening said poppet valve a predetermined amount so as to control the rate of fluid transferred from said one end of said cylinder to said reservoir and thereby control the speed of lowering said bowl, said means comprising a fluid operated actuator slidably located in said housing and having a projection for engaging said poppet valve, conduit means connecting one side of said actuator with said pressurized end of said cylinder, a control valve interposed in said conduit, said actuator having a fluid bleed passage interconnecting said one side of said actuator with the reservoir, means fixed with said housing and located in said bleed passage to provide an increase in the size thereof when said actuator moves in a direction to unseat said poppet valve, said control valve adapted to increase the flow rate of said pressurized fluid to said one side of said actuator whereby the latter is moved to unseat said poppet valve until the forces acting on the opposite sides of the said poppet valve are balanced.

11. The combination of claim 10 wherein said means fixed with said housing comprises an elongated tapered pin.

References Cited

UNITED STATES PATENTS

| | | | |
|---|---|---|---|
| 2,394,384 | 2/1946 | Horstmann | 91—401 |
| 2,694,544 | 11/1954 | Hall | 251—35 |
| 3,039,211 | 6/1962 | Rezabek | 37—129 |
| 3,198,088 | 8/1965 | Johnson et al. | 91—420 |

MARTIN P. SCHWADRON, *Primary Examiner.*

PAUL E. MASLOUSKY, EDGAR W. GEOGHEGAN,
*Examiners.*